US005659318A

United States Patent [19]
Madsen et al.

[11] Patent Number: 5,659,318
[45] Date of Patent: Aug. 19, 1997

[54] INTERFEROMETRIC SAR PROCESSOR FOR ELEVATION

[75] Inventors: Soren N. Madsen, Pasadena; Paul A. Rosen, La Crescenta; David A. Imel, Altadena; Scott Hensley, Fullerton; Jan M. Martin, Altadena; Yunjin Kim, Glendora, all of Calif.

[73] Assignee: California Institute of Technology, Pasadena, Calif.

[21] Appl. No.: 657,602

[22] Filed: May 31, 1996

[51] Int. Cl.$^6$ .................................................. G01S 13/90
[52] U.S. Cl. .............................. 342/25; 342/156; 342/196
[58] Field of Search ............................ 342/25, 190, 191, 342/192, 193, 194, 196, 156

[56] References Cited

U.S. PATENT DOCUMENTS

| | | | |
|---|---|---|---|
| 4,321,601 | 3/1982 | Richman | 343/5 |
| 4,975,704 | 12/1990 | Gabriel et al. | 342/25 |
| 5,424,743 | 6/1995 | Ghiglia et al. | 342/25 |
| 5,463,397 | 10/1995 | Frankot | 342/25 |

OTHER PUBLICATIONS

S.N. Madsen, *On absolute phase determination techniques in SAR interferometry*, SPIE conf. on Radar Sensor Technology, 2487:393, Apr. 19–21, 1995.

Madsen, et al., *Analysis and evaluation of the NASA/JPL Topsar across-track interferometric SAR*, IEEE trans, Geoscience and Remote Sensing, 33(2):383, Mar. 1995.

Madsen, et al., *Topographic Mapping Using Radar Interferometry: Processing Techniques*, IEEE trans. Geo-science and Remote Sensing, 31(1):246, Jan. 1993.

Madsen, et al., *Automated Absolute Phase Retrieval in Across-track Interferometry*, Proc. of the International Geoscience and Remote Sensing Symposium, IGARSS'92, 2:1582, May 26–29, 1992.

*Primary Examiner*—John B. Sotomayor
*Attorney, Agent, or Firm*—Fish & Richardson, P.C.

[57] ABSTRACT

An interferometric Synthetic Aperture Radar (SAR) system having a special-purpose processor to integrate motion compensation, interferogram coregistration, and a spectral shifting for optimal interferogram correlation together to achieve efficient, accurate, and robust three-dimensional imaging. A simple radar mapping coordinate system is implemented in the present invention to enhance the overall image processing and in particular to improve the accuracy and efficiency. The present invention substantially improves the fidelity and efficiency of phase unwrapping by incorporating phase-bootstrapping process, a correlation filter, and other processes. Absolute phase determination is implemented without known ground references by two proposed techniques employing cross-correlation of sub-patches to generate a number of estimates within a patch and weighting correlation processes.

14 Claims, 5 Drawing Sheets

INTERFEROMETRIC SAR PROCESSOR FOR ELEVATION

FIELD OF THE INVENTION

The present invention relates to the field of remote sensing with electromagnetic waves. More particularly, the present disclosure describes a method and a system of improving the accuracy, automation, and resolution of high-resolution digital topographic elevation data using interferometric synthetic aperture radars.

BACKGROUND AND SUMMARY OF THE INVENTION

A Synthetic Aperture Radar (SAR) takes advantage of digital signal processing to synthesize high-quality radar images from a plurality of lower quality images. Outputs of one moving antenna at different locations and times, or a plurality of spatially separated antennas, are synthesized together to achieve higher resolution images than would be possible from a single radar with the same aperture size.

Two types of SARs include a radar array having a plurality of antennas that are stationed at different locations on the ground and a moving radar carried by an aircraft or spacecraft. The preferred embodiment as described herein uses the latter. The terminology of "Synthetic Aperture Radar" or "SAR" will be used herein to describe a moving radar system on an aircraft or spacecraft.

In topographic mapping using a SAR system, the aircraft or spacecraft flies over a targeted region along a flight track to collect data. The single antenna serves as both the signal transmitter and the signal receiver. After the transmitted electromagnetic pulses hit the targeted area, scattered pulsed waves are generated in many directions. The antenna receives a portion of the backscattered energy from the pulses imaging the targeted area. The slant range position of a particular target in the area to be mapped can be determined by measuring the time delay between transmitting and receiving of a pulse. A SAR processor processes the received signals by digital or optical signal processing techniques. The SAR system can produce a high-resolution two-dimensional map of a targeted area based on the amplitude and phase information of the received "backscattered pulses". Such SAR systems are well known to the art. One well-recognized limitation thereof is the lack of information about the target height or elevation.

An interferometric SAR is a particular kind of SAR system having two spatially displaced antennas installed on an aircraft or spacecraft. One significant improvement of an interferometric SAR system over the single-antenna SAR system is its capability of obtaining the information on a third dimensional parameter of a target to thereby produce high-resolution 3D topographic images. Similar to a single-antenna SAR system, the aircraft or spacecraft in an interferometric SAR system flies along a flight track over a targeted area for mapping. Either one or both of the antennas can serve as transmitters to send coherent electromagnetic pulses to an targeted area. A portion of the backscattered pulses from the target area is received by both antennas.

The location of the aircraft or spacecraft is known from independent sources such as global positioning system (GPS), digital avionics data system (DAD) and/or inertial navigation units (INU). Thus two-dimensional images of the targeted area can be obtained by digital signal processing techniques based on the amplitude and phase information of the received backscattered pulses from each antenna. The two images thereof are nearly identical due to the relatively small spatial displacement of the two antennas with respect to the slant range from the targeted area to the aircraft or spacecraft.

Interferometric SAR technology takes advantage of the coherent interference of the two 2D images from the two antennas. In particular, SAR interferometry employs the phase difference resulting from the relatively small difference in the slant range from a point in the targeted area to the two antennas to extract data for a third dimensional parameter. That third parameter is preferably the elevation or the height variation of the targeted area. This elevation information allows a three-dimensional topographic map to be obtained.

In general, radar techniques for precision topographic maps have many advantages over traditional stereo photography, including all weather, day and night capability, potentially fast automated processing, and the potential to provide absolute location without using known ground reference points. Traditional radargrammetry is capable of generating three dimensional images by using two spatially separated antennas for detection and by extracting elevation information directly from the difference in the slant range of a targeted point to two antennas. The separation of the two antennas is known as the "baseline". A large baseline is required in order to achieve good image resolution in traditional radargrammetry, which increases the complexity in coregistration of the two radar images.

Interferometric SAR technology significantly improves the three dimensional mapping capability of the traditional radargrammetry by using the phase difference instead of slant range difference of two radar images. As known in the art, such a phase signal is sensitive to range changes of fractions of a wavelength, which is in a range of $10^{-2}$ m for a radio wave of several GHz. This property of phase enables SAR interferometry to achieve better accuracy than traditional radargrammetry in additional to other technical advantages. As a powerful tool for producing topographic maps, airborne interferometric topographic SAR is able to provide high resolution 3-dimensional maps with horizontal and vertical accuracy at the order of a meter.

There are several critical technical issues involved in interferometric SAR including:(1) accurate radar platform positions and interferometric baseline estimates; (2) Motion compensation in signal processing; (3) Preservation of relative signal phases in the processor; (4) An algorithm to determine the absolute phase; (5) A 3-dimensional location algorithm.

SAR interferometry uses the phase information, and hence requires several interferometric SAR techniques to work cooperatively. This phase processing is a rather complex process due to a number of facts. The irregular topography of the unknown targeted area can adversely affect the determination of the corresponding unambiguous interferometric phase in a consistent manner. More over, the actual flight track of the aircraft changes constantly and randomly due to various reasons. Therefore, the range will change accordingly which causes systematic phase variations that must be corrected appropriately. The detected signals are inherently noisy due to factors such as electromagnetic interference, receiver electronic noise, multi-pass reflection noise from the aircraft, and topographic profile of the targeted area. For these and other reasons, the techniques for phase determination in interferometric SAR must be sophisticated and sensitive as they are crucial to the fidelity and accuracy in topographic mapping.

In recognition of these problems and drawbacks, the present invention describes an integrated processing system for SAR interferometry. The present invention implements correction of radar platform motion deviations, interferogram coregistration of images from two antennas, and a spectral shifting for optimal interferogram correlation. These and other processes work together to achieve highly accurate and automated 3D topographic mapping.

One foundation for the present invention is an unique coordinate system, the SCH-system, upon which the radar platform motion compensation, many processing operations, and result reporting are based. The SCH-system is optimized for a particular point on the flight track of the radar platform and uses a radius of the curvature of the earth thereof that is a function of both that point and the heading of the flight track. The advantages of this SCH-system will become apparent in detailed descriptions hereinafter.

As stated above, phase determination is a key element in an interferometric SAR processing system. The present invention implements sophisticated processes to ensure the effectiveness, efficiency, accuracy, and robustness in determining the relative phase values in all image segments as well as the absolute phase of a particular image segment for the absolute phase values of the entire image. One unique feature of the algorithms for absolute phase determination is that the present invention can operate without known ground reference points to determine the absolute phase.

High-resolution three dimensional topographic mapping provides essential information for positioning. Such positioning has myriad uses including navigation, geological exploration, seismic studies and other fields. The ability to acquire this information may very well lead to new fields of art which are not yet even conceived!

The advantages, sophistication, and significance of the present invention will be more apparent in the light of the following detailed description of preferred embodiments thereof, as illustrated in the accompanying drawings.

DESCRIPTION OF THE PREFERRED EMBODIMENTS

Figure 1:
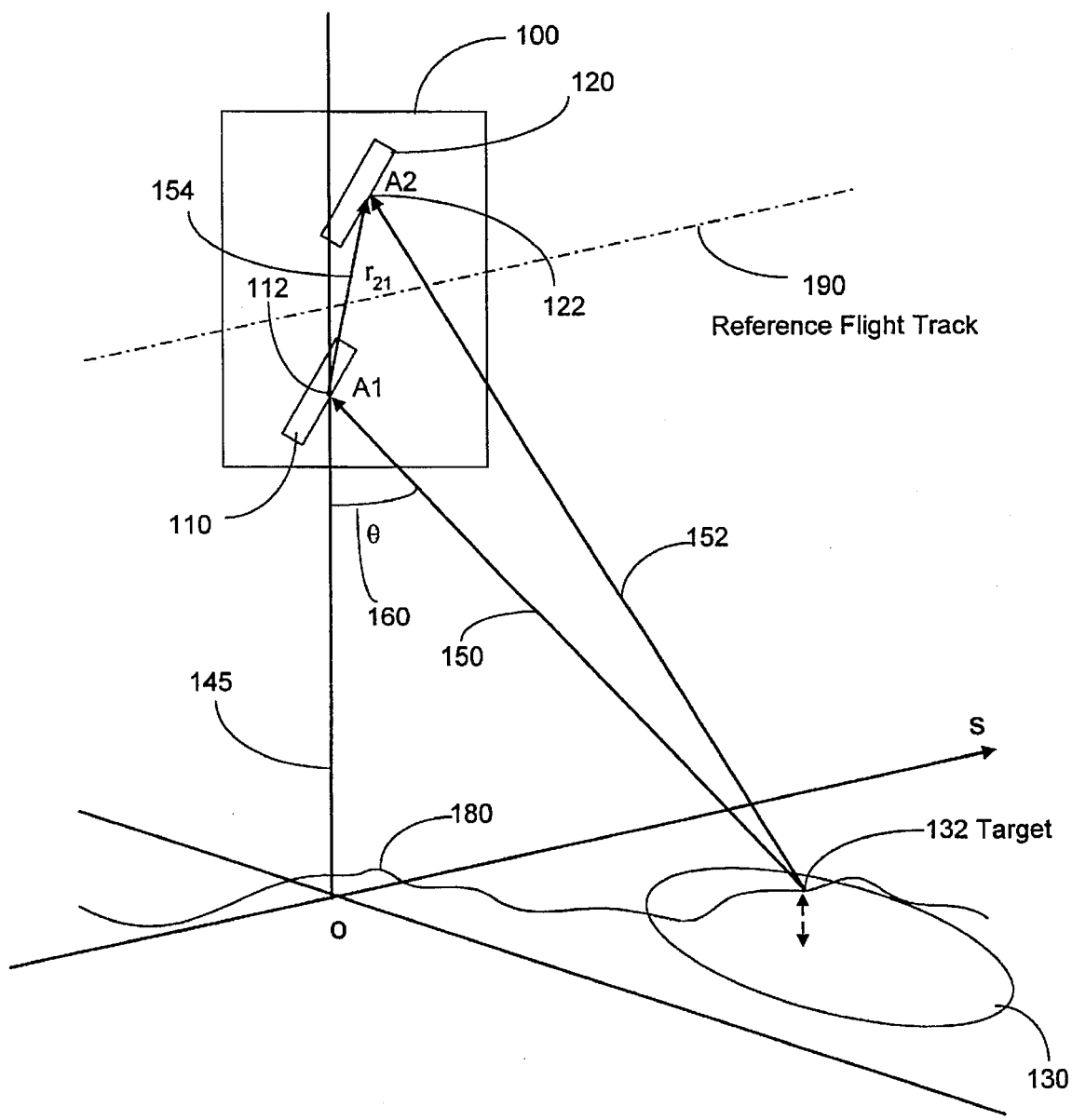
FIG. 1 is an illustration of a simplified SAR interferometer that is known to the art.

For simplicity, FIG. 1 is used to establish a basic geometry of an interferometric SAR. A radar platform 100, which can be an aircraft or a spacecraft, carries two spatially displaced antennas which are preferably of identical physical characteristics. Antenna No. 1 is denoted by 110 and Antenna No. 2 is denoted by 120. The two antennas 110 and 120 are located at location A1 (112) and location A2 (122) on the radar platform 100, respectively. An area 130 is a ground area that can be illuminated by an electromagnetic pulse in the region whose topographic map is of interest. Target 132 is one of many random objects located within the area 130.

At a certain moment during its flight, the radar platform 100 flies to a position where the direct vertical projection of A1 (112) on the ground is a location O denoted by 140. A local right-handed SCH coordinate system 145 is established at this moment, in which the s-direction is the along-track direction and c-direction is the cross-track direction. Preferably, this local SCH coordinate system is employed in implementing the present invention. However, other coordinate systems such as spherical and ellipsoid systems can also be used with the present invention.

The flight track is preferably a predetermined continuous track of constant altitude. The direction along the flight track is called azimuth direction. The radar platform 100 will follow the flight track during the mapping measurements but will also randomly deviate from the flight track due to technical and environmental factors.

The vectors $r_{T_1}$ 150 and $r_{T_2}$ 152 pointing from the target 132 to antennas No. 1(110) and No. 2(120) are range vectors. The vector $r_{21}$ denoted by 154 pointing from antenna No. 1 (110) to antenna No. 2 (120) represents the baseline vector of the two antennas. The angle $\theta$ 160 denotes the look angle of the SAR interferometer.

Both azimuth and range information in the detected data are used in SAR interferometry to determine the location of a target. The geolocation of the radar platform 100 (e.g., an aircraft or a spacecraft) is provided by an independent source or a combination of a plurality of independent sources, examples of which include GPS, DAD, INU or IMU. The present invention combines GPS and INU/IMU together to fully utilize the long-term precision and stability of GPS and the fast updating information from INU/IMU.

Two antennas No. 1 and No. 2 both serve as receivers while either one or both thereof can transmit signals. There is an advantage in transmitting and receiving signals on both antennas because the corresponding effective physical baseline is twice as much as that in a configuration that only one of the two antennas transmits signals. Discussion herein includes both configurations.

As the radar platform 100 flies along a predetermined track, Antenna No. 1 (110) repetitively transmits electromagnetic pulses to the area 130. Each pulse spreads out spatially as it travels towards the area 130. The ground illumination of two sequentially transmitted pulses preferably have substantial overlap in order to form a properly sampled synthetic aperture in azimuth. The pulse timing or the pulse repetition frequency can be set in two preferred ways for convenience and consistency in measurements. One preferred method is to set the pulse repetition frequency to a constant which may result in uneven spacing on the ground due to the velocity variation of the radar platform 100. A second preferred way is to adjust the pulse repetition frequency according to the spontaneous speed of the radar platform 100 so that the centers of illuminated areas by the transmitted pulses are nearly equally spaced on the ground.

Both antenna No. 1 (110) and No. 2 (120) receive a portion of a backscattered pulse originated from the illuminated area 130. Each detected pulse signal by either Antenna No. 1 (110) or Antenna No. 2 (120) includes information in the form of phase and amplitude of the entire area 130 including random objects thereof such as the target 132. As the radar platform 100 flies along a predetermined flight track over the region of interest, the topographic information of the region is embedded in the received pulse signals and processed to generate a three dimensional radar image.

As shown in FIG. 1, the phase φ corresponding to the range difference from the two antennas to a target 132 can be expressed as the following:

$$\phi = -\frac{2\pi}{\lambda} p(r_{2T} - r_{1T}) = -\frac{2\pi f}{c} p(r_{2T} - r_{1T})$$

where c is the speed of light, p is 1 or 2 depending whether one or two antennas are used for receiving signals, λ and f are the carrier wavelength and frequency of pulsed radar signals, respectively. The phase φ in the above equation is the absolute unwrapped phase value that is proportional to the range difference as well as the carrier frequency f. The phase information is retrieved by coherently combining the two images from the two antennas to form an "interferogram", in which the phase is measured modulo 2π. The present disclosure describes utilization of different techniques to unwrap and to determine the absolute phase value in the preferred SAR processing systems in accordance with the present invention.

Figure 2:
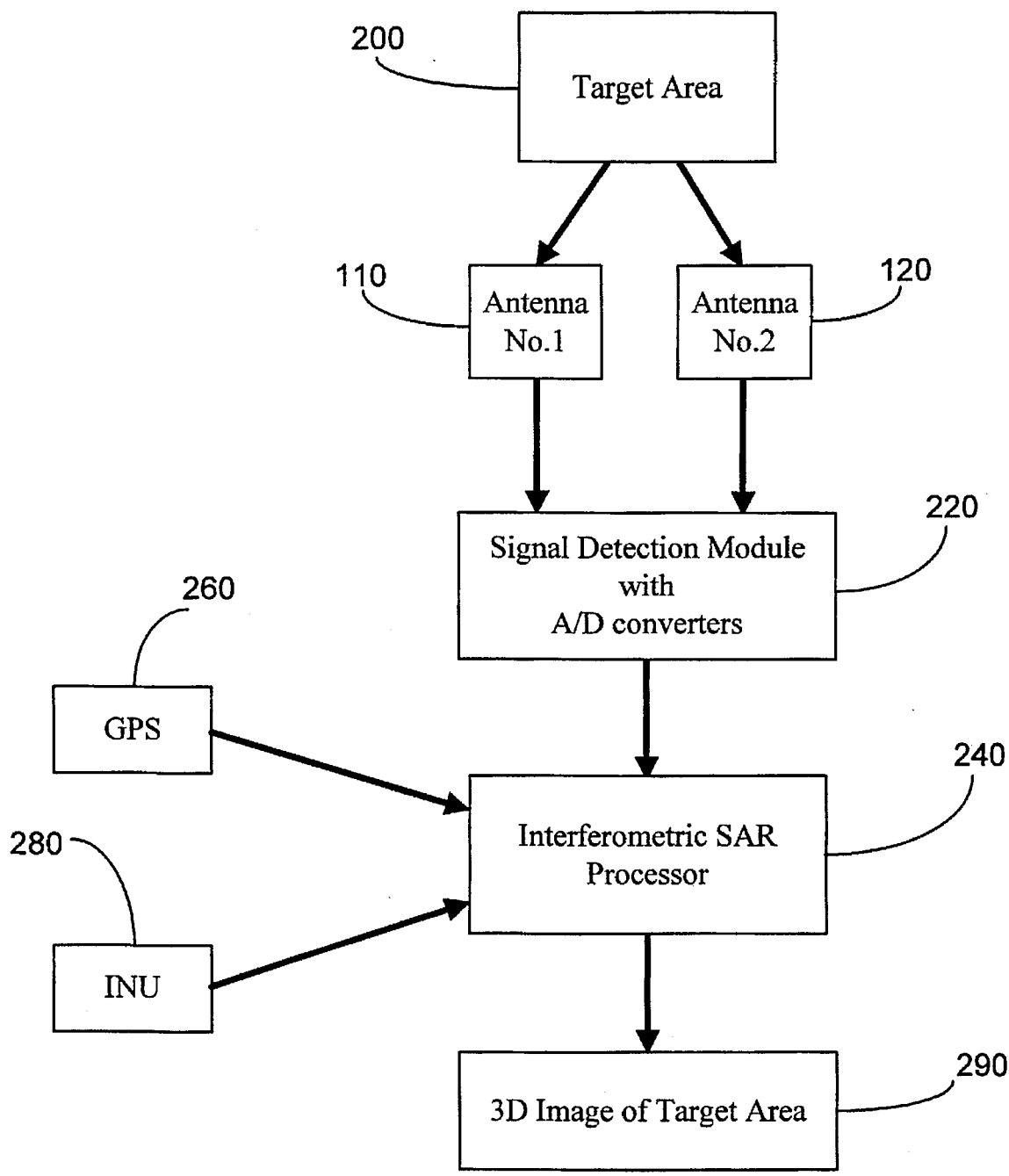
FIG. 2 shows a function block diagram of the present invention.

FIG. 2 is a block diagram of the interferometric SAR system described in the present invention. The two antennas 110 and 120 receive backscattered coherent electromagnetic pulses from a target area 200 to be mapped. Signal detection module 220 converts the received analog signals into digital form (e.g., 8-bit data) by analog-to-digital converters. An interferometric SAR processor 240 further processes the digital signals of the target area 200 to produce high-resolution 3D images 290 indicative thereof. Navigation systems including GPS 260 and INU 280 provide accurate information on the motion of the radar platform 100 and orientation of the radar baseline 154 for the processor 220 in various processes including motion compensation, azimuth compression, and 3D geolocation process.

Figure 3:
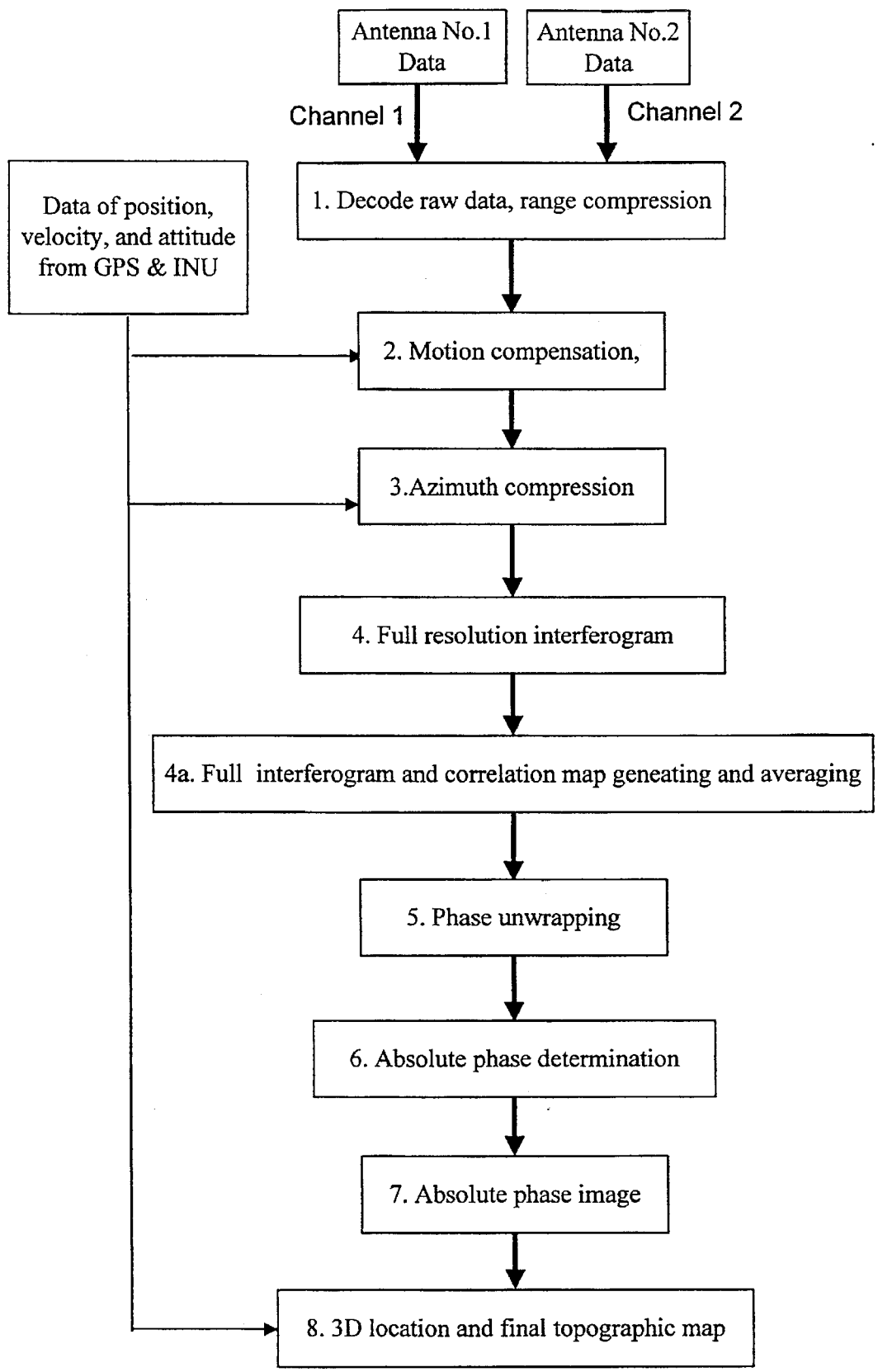
FIG. 3 shows the flow chart of the first embodiment of the interferometric SAR processor of the present invention.

FIG. 3 is the flow chart of the first embodiment of the interferometric SAR processor in the present invention. The raw data from the two antennas is first divided into a series of small patches for both channels with each patch being the data collected over a fraction of entire mapping flight. To provide a reference for entire signal processing two adjacent patches have some overlap in order to ensure continuity among different data patches. The raw data is then processed through range compression, motion compensation, azimuth compression, interferogram, phase unwrapping, and absolute phase determination to produce the final three dimensional radar images.

The inventors recognize the limitations of various conventional coordinate systems including rectangular Cartesian coordinates, spherical coordinates, and ellipsoid systems in topographic imaging applications such as the present invention. Therefore, a unique SCH coordinate system is preferred in the present invention though other coordinate systems can also be used with the present invention with either increased processing complexity or reduced accuracy.

In choosing a reference path, it is desired that the path be close to the path the radar platform flies during a data collecting flight and this reference path have a simple closed form expression. In practice, it is difficult for the platform to fly within a few meters of a global reference track, which otherwise would greatly simplify the data processing. Thus local reference tracks are necessary and there is some latitude in selecting the global reference track. The radar platform flies either a geodesic, i.e., a path of shortest distance between two points, or a loxodrome, i.e., a path of constant heading, during a data collecting flight. Loxodromes in general are not geodesics but are simpler for a flight system to handle since the heading remains constant. A geodesic in contrast has a continuously-changing heading. Both of these flying modes are included in the SCH system for the present invention.

A SCH coordinate system is entirely defined by a latitude, longitude, track heading, and a reference ellipsoid such as the widely accepted WGS-84 ellipsoid. The SCH-system is optimized for a particular peg point on the flight track of the radar platform and uses a radius of the curvature of the earth thereof that is corrected for both the peg point and the particular heading of the flight track. Thus, the SCH system is a curved coordinate system in which the s-direction points to the direction of the flight track, the h-direction points outward from the peg point representing the height, and the c-direction is in a cross-track direction to form a right-handed system.

In relation to WGS-84 coordinates, (x,y,z), the SCH system is defined relative to the sphere tangent to the ellipsoid at a peg point, $(\theta_0, \lambda_0)$, having radius $r_a$ that is the radius of curvature in the along track direction given by $$r_a = \frac{r_e(\lambda_0) r_n(\lambda_0)}{r_e(\lambda_0)\cos^2\eta + r_n(\lambda_0)\sin^2\eta}$$

where $r_n$ and $r_e$ are the north curvature and east curvature, respectively, and η is the heading, i.e., the actual track angle. A sphere of radius $r_a$ intersecting with the peg point is the approximating sphere. The present invention takes the equator of the approximating sphere to be the reference track, assumed to be a great circle on the sphere. The prime meridian to the approximating sphere is the intersection of the sphere and the place determined by the unit normal vector, U, to the ellipsoid and the cross track vector C=U×T, where T is the unit tangent vector to the reference curve. The SCH coordinates (s,c,h) are defined as the distance along the reference curve from the peg point, the distance from the reference curve along a meridian at a distance s from the peg point, and the height above the approximating sphere respectively. Let (x',y',z') be geocentric coordinates for the approximating sphere where the x'-axis is U, the y'-axis is C. Then the transformation from (s,c,h) to (x',y',z') is $$\begin{pmatrix} x' \\ y' \\ z' \end{pmatrix} = \begin{pmatrix} (r_a+h)\cos\left(\frac{c}{r_a}\right)\cos\left(\frac{s}{r_a}\right) \\ (r_a+h)\cos\left(\frac{c}{r_a}\right)\sin\left(\frac{s}{r_a}\right) \\ (r_a+h)\sin\left(\frac{c}{r_a}\right) \end{pmatrix}.$$

Note that the above transformation will have a meridian convergence on the order of 2 m for a swath that is 200 km long and 30 km wide. This can be avoided with a slightly different transformation, however, the above formulation is adopted because it is a simpler transformation.

Next, the transformation from (x',y',z') to WGS-84 coordinates (x,y,z) is given by an affine transformation of the form $$\begin{pmatrix} x \\ y \\ z \end{pmatrix} = M_{ENU}^{xyz} M_{xyz}^{ENU} \begin{pmatrix} x' \\ y' \\ z' \end{pmatrix} + O,$$

where O is a translation vector, $M_b^c$ is the transformation matrix from frame b to frame c, and the ENU frame is a basis for the tangent space at the peg point with E a unit vector in the east direction and N a unit vector in the north direction. To obtain the transformation matrix from (x',y',z') to ENU, observe that they are related by a rotation about the U (or x') axis by the track angle η. Thus, the (x',y',z') to ENU transformation matrix is $$M^{ENU}_{x'y'z'} = \begin{bmatrix} 0 & \sin(\eta) & -\cos(\eta) \\ 0 & \cos(\eta) & \sin(\eta) \\ 1 & 0 & 0 \end{bmatrix}.$$

The transformation matrix from ENU to (x,y,z) is just the matrix formed by the column vectors of E, N, and U in (x,y,z) coordinates, which is given by $$M^{xyz}_{ENU} = \begin{bmatrix} -\sin(\theta_o) & -\sin(\lambda_o)\cos(\theta_o) & \cos(\lambda_o)\cos(\theta_o) \\ \cos(\theta_o) & -\sin(\lambda_o)\sin(\theta_o) & \cos(\lambda_o)\sin(\theta_o) \\ 0 & \cos(\lambda_o) & \cos(\lambda_o) \end{bmatrix}.$$

The translation vector O is given by $$O = P - r_a U$$

where $P=(r_e(\lambda_o)\cos(\lambda_o)\cos(\theta_o), r_e(\lambda_o)\cos(\lambda_o)\sin(\Phi_o), r_e(\lambda_o)(1-e^2)\sin(\lambda_o))$ is the vector from the center of the ellipsoid to the peg point. Thus, the transformation can be specified by only three numbers: the latitude and longitude of the peg point and the heading of the reference curve at the peg point.

The inventors have evaluated the above SCH coordinate system with reference to other systems and recognized the significant advantages of the SCH system. For example, since the ellipsoidal geometry is complicated it is desired to approximate the ellipsoid locally with a simpler surface (e.g, a cylinder or sphere). SCH system not only provides a simpler local surface approximation but also provides easier and more accurate parameters of a reference path along the new surface with less geometric distortion than other coordinate systems. Another advantage of the SCH system is that it more accurately matches the typical flight tracks of radar platforms in data collection than other systems. A further advantage of the SCH system is, that the transformation between the SCH system and the WGS-84 ellipsoid is an exact transformation without approximation. Moreover, the transformation is an affine transformation.

The following is a detailed description of each processing stage in the interferometric SAR processor of FIG. 3 disclosed herein.

1. Raw Data Decode and Range Compression

In the present invention, a range compression algorithm processes the detected signals from each interferometric channel in terms of spatial frequencies in the range dimension. In radar imaging, the transmitting pulse signals can be and preferably are frequency-modulated or chirped to increase the detection resolution. The range chirp reference functions are first calculated, that is, the matched filter functions to the transmitted waveform. Then range compression process is accomplished by standard Fast Fourier Transform (FFT) correlation methods which perform a cross correlation of the reference functions and the detected signals from each data channel: first Fourier transforming both channels and the reference functions; then multiplying the phase conjugate of the transformed reference functions and the two transformed channels; last Fourier transforming the multiplication thereof to obtain the cross correlation functions. This implementation allows a relative linear phase variation on one of the frequency domain reference functions. This phase shift is selected to ensure that the time and phase delays through the two channels are equal at a common reference track described herein.

2. Motion Compression, Phase Shift and Data Resampling

One difficulty in interferometric SAR processing is the deviation in motion of the radar platform 100 from a straight flight track. The attitude of the platform 100, and thereby the radar baseline vector $r_{21}$, constantly change in a random fashion due to technical limitations in attitude control of the platform 100 and environmental factors. The changing attitude of the platform 100 translates into height and cross-track errors. Furthermore, it is well known that translational deviations from a straight flight track cause undesired image cross-track displacements as well as azimuth displacements and defocusing. The attitude change makes the motions of the two antennas different, causing the azimuth shifts of the two images to be different. This can result in severe phase decorrelation. Precise motion compensation is therefore of vital importance for high-resolution interferometric SAR systems. The present invention achieves highest image quality and interferometric correlation by a special technique of compensating each channel for platform motion.

Independent navigation sources GPS and INU are combined to provide accurate for the attitude data of the platform 100, and thereby the geolocations of the two antennas 110 and 120, at each transmitted pulse. The SCH coordinate system is used for all the data processing.

As mentioned previously, the entire data collected for an area to be mapped in a complete data flight pass is broken into a series of small patches in the present invention (e.g., about 700 m per patch over a flight of 30 km). This step is necessary because the random motion deviation of the platform makes it difficult to apply a common reference flight track for the entire data pass. In the present invention, a local linear flight track coincident with the actual track at the center of each patch is used as the reference flight track in motion compensation for data points in that particular patch. Specifically, a local reference track for each patch is defined to be parallel to the global track (s,0,0) as in the SCH system but offset by an amount that in the c-coordinates is the average of c positions of the two antennas at the center of the patch and correspondingly in the h-coordinate is the average of h positions of the two antennas at the center of the patch. The look vector or the line-of-sight vector is also calculated with respect to this local reference track.

Before the motion compensation takes place, a presumming procedure resamples both data channels in order to align the two channels to each other and to a pre-determined s-coordinate spacing. For a fixed pulse repetition frequency in transmitting pulses, this presumming is critical to the implementation of the (s,c,h) concept of reference track definition for processing due to the variation in the speed of the radar platform. For the other preferred pulsing mode that has a variable pulse repetition frequency to maintain constant spacing on the ground, the presumming is still essential to implement arbitrary s-spacings for processing. In addition, the Doppler effect is taken into account to support the squinted observations.

Presumming is done by applying a phase ramp to the data to move it to baseband, weighting it by a truncated sinc-function filter and summing. The sinc filter is band-limited appropriate to the desired presumming ratio. This presumming procedure reduces data taken by using the either preferred pulsing mode or other pulsing modes to the same time independent algorithmic steps so processing disparate data takes is automatically and conveniently referenced to the same SCH coordinate system. Doppler centroid for presumming is computed from the line-of-sight vector relative to a flat reference plane used by the processor and the platform velocity. The look vector and velocity are computed at the center of a data patch using attitude data from INU so that the Doppler frequencies associated with each pulse in the patch are an azimuthally constant function of range.

Next, the motion compensation algorithm projects both channels onto the local reference track. This operation induces a range shift as well as a corresponding phase shift for each data point in that patch for both channels.

A resampling process interpolates the data at the shifted range value and adjusts the phase of each data point by an amount of phase shift described above.

Upon the completion of range compression and motion compensation, the two interferometric channels are aligned in both azimuth and in range except for small local offsets induced by topography.

3. Azimuth Compression

Azimuth compression performs a Fourier cross correlation of each data channel with an azimuth reference function to obtain two range-Doppler images from two data channels. Each channel is Fourier-transformed in the azimuthal dimension. Prior to azimuth compression, A correction of range migration is performed identically on both channels to take account of the dependence of range on the relative position of the radar platform and the target.

Range migration is done in the azimuth frequency domain centered about the Doppler centroid. The amount of range migration $\delta r_k$ relative to the centroid at a given range bin $r_k$ is computed. Points located at $(r_k + \delta r_k)$ are derived interpolation and placed at range location $r_k$.

Next, azimuth compression follows. The azimuth reference function is the matched filter function for the transmitted pulses in the azimuth dimension. The azimuth reference function can be weighted in amplitude if desired. Next follows the multiplication of the complex conjugate of the Fourier-transformed azimuth reference function and the Fourier-transformed data from each channel. Then an inverse Fourier transform is carried out on the above product for each channel to obtain the range-Doppler images.

4. Full Resolution Interferogram

The two channels are now well coregistered. The interferogram of the two channels is formed by multiplying one channel with the complex conjugate of the other chapel pixel by pixel. Then the product pixels are summed in azimuth until the interferogram pixels are approximately geometrically square. Both amplitude information and the phase difference between the two channels are contained in the interferogram image and power array. The interferogram is the pixel-by-pixel image of phase difference between the two channels. The power array consists of the pixel-by-pixel power values corresponding to the interferogram.

5. Phase Unwrapping

Phase unwrapping determines the relative phase values of all data points within an image patch. Before unwrapping, the interferogram and power array are smoothed by boxcar filtering to a spatial resolution desired for the output map. A magnitude array is obtained by taking the geometric mean of the channel amplitudes with a weighting function correcting for a propagation loss having $r^3$-dependence and antenna pattern variations across the swath. Further smoothing is performed to reduce phase noise in the interferogram.

To increase the reliability of phase unwrapping, the present invention employs a pixel-by-pixel correlation array to indicate regions wherein phase unwrapping is likely to be difficult. This correlation array is formed by the ratio of the absolute value of the interferogram and the geometric mean of the power values of the two channels. A predetermined correlation value (e.g., 0.45) called the correlation threshold is used to single out some low-correlation regions from phase unwrapping process.

Next, the phase unwrapping process is invoked. The conventional phase unwrapping process is known to the art. For example, one can refer to Goldstein et al., "Satellite radar interferometry: Two-dimensional phase unwrapping", in Radio Science, Vol. 23, No. 4, pp. 713–720, 1988, for conventional techniques used for phase unwrapping in interferometric SAR processing. The present invention significantly improves the efficiency and accuracy of phase unwrapping by incorporating several novel processes therein, which comprises:

(1) Phase Bootstrapping. It is often the case that there are multiple components of contiguously connected phase areas in a patch separated by regions of low correlation. Phase unwrapping cannot occur across these low-correlation regions due to the filtering mechanism based on the correlation array described herein. To maximize coverage, each region is individually identified and phase unwrapped. If a region has some overlap with phases from the previous patch, some of which are saved in a temporary array, then the unwrapped phase is adjusted to lie within $\pi$ radians of the previous patch phase. Thus the two patches are "bootstrapped" in phase. If there is no overlapping valid phase, the entire region is labeled invalid. If the variance of the phase difference in the overlap region is found to exceed a predetermined value (e.g., 2 radian), then it is assumed that there is a phase unwrapping error and the entire region is marked as invalid.

(2) Correlation Thresholding/Masking. After all individual contiguous components are unwrapped and bootstrapped, the area of unwrapped regions is computed. If the area falls below a certain percentage of the total area (e.g., 80%), the correlation threshold is raised to a higher correlation value than the initially set value (e.g., raised to 0.5 from 0.45). The entire phase unwrapping procedure is repeated thereafter. This correlation thresholding removes the "bad" regions of questionable fidelity and results in more pixels having valid phase values. The threshold is raised in a small increment (e.g., 0.05) to a maximum value (e.g., 0.65). If the coverage criterion is not met at the maximum threshold value, the system continues the processing with the available data.

(3) Phase bootstrapping is invoked in lieu of absolute phase determination after the first patch on the connected components. This is to reduce redundant processing to increase the efficiency of the processor.

(4) For the first patch, only one connected component is phase unwrapped. Depending on the nature of the scene, it can occur virtually anywhere in the patch and can be 0f any size. No attempt is make to use the largest connected component; the first found component is used. Thus it is possible to have a very small region. This is to discourage start of acquisition in a region of dubious phase quality. The absolute phase algorithm depends strongly on a large unwrapped region covering most of the swath, with few low-correlation regions. Assuring this in flight planning rather than conditioning the algorithm to arbitrary phase fields is more expeditious and robust.

(5) Occasionally a patch can result in invalid phase unwrapping results, in which no phase is valid and there will be no overlap with the following patch. When there is no overlap at all, absolute phase is invoked again on the following patch. There will be no overlap with the following patch. Therefore a blank region will appear in the final map. This small blank region can be filled in later by special processing of sub-swaths, where phase unwrapping errors often disappear because regions of trouble are isolated manually.

6. Absolute Phase Determination

After phase unwrapping, the phase value of each image pixel within a patch is known and so are the phase values of its bootstrapped patches. However, this phase value of a patch may be offset by some integer number of cycles from the true value, that is, the absolute phase. The absolute phase is a phase value that directly proportional to the slant range difference from a target to the two antennas in a SAR interferometer.

As described therein, the present invention needs to invoke the algorithm for the absolute phase determination only once by employing the "phase bootstrapping" technique. If a patch does not produce any points of overlap for some reason (e.g., unwrapping errors, unfavorable viewing geometry), the absolute phase process will be invoked on the following patch.

The absolute phase can be determined with or without known ground references. The method using a known ground reference is straightforward and known to the art, in which the longitude, latitude, and the elevation of the reference are known and the phase of the corresponding point in the interferogram image can be readily computed after identification of the reference within the interferogram image. Absolute phase determination techniques without known ground references rely on cross-correlating sub-patches to generate a number of estimates within a patch that has a common undetermined phase constant. A weighted estimate of the absolute phase constant is determined by weighting these estimates by the correlation of the region.

7. Absolute Phase Image

The results of the phase unwrapping and absolute phase determination are not the final phase values. An atmosphere delay correction must add to the phase. To the first order, this phase correction is comprised of a scaling of the light speed in free space to account for path delay. In addition, a look-angle dependent phase correction is also applied in the mapping of phase to height. After adding these phase corrections, an interferogram with final absolute phase values at each pixel can be constructed.

8. 3D Location and Final Topographic Map

The final process is to compute the three dimensional position of each pixel in the interferogram. With known baseline and range, the look vector $r_{1T}$ shown in FIG. 1 is determined from the absolute interferometric phase. The location coordinates (s,c,h) of the output point is mapped to a grid quantized in s and c by nearest neighbor interpolation. Each point is copied to its three neighboring pixels to form a 2×2 box. A final 3D radar map is then obtained.

The SAR interferometry processor shown in FIG. 3 requires an extra resampling procedure after the azimuth compression and before the formation of the interferogram if the attitude data for the radar platform is not accurate. This is often the case for SAR interferometry with spacecraft such as a satellite.

Figure 4:
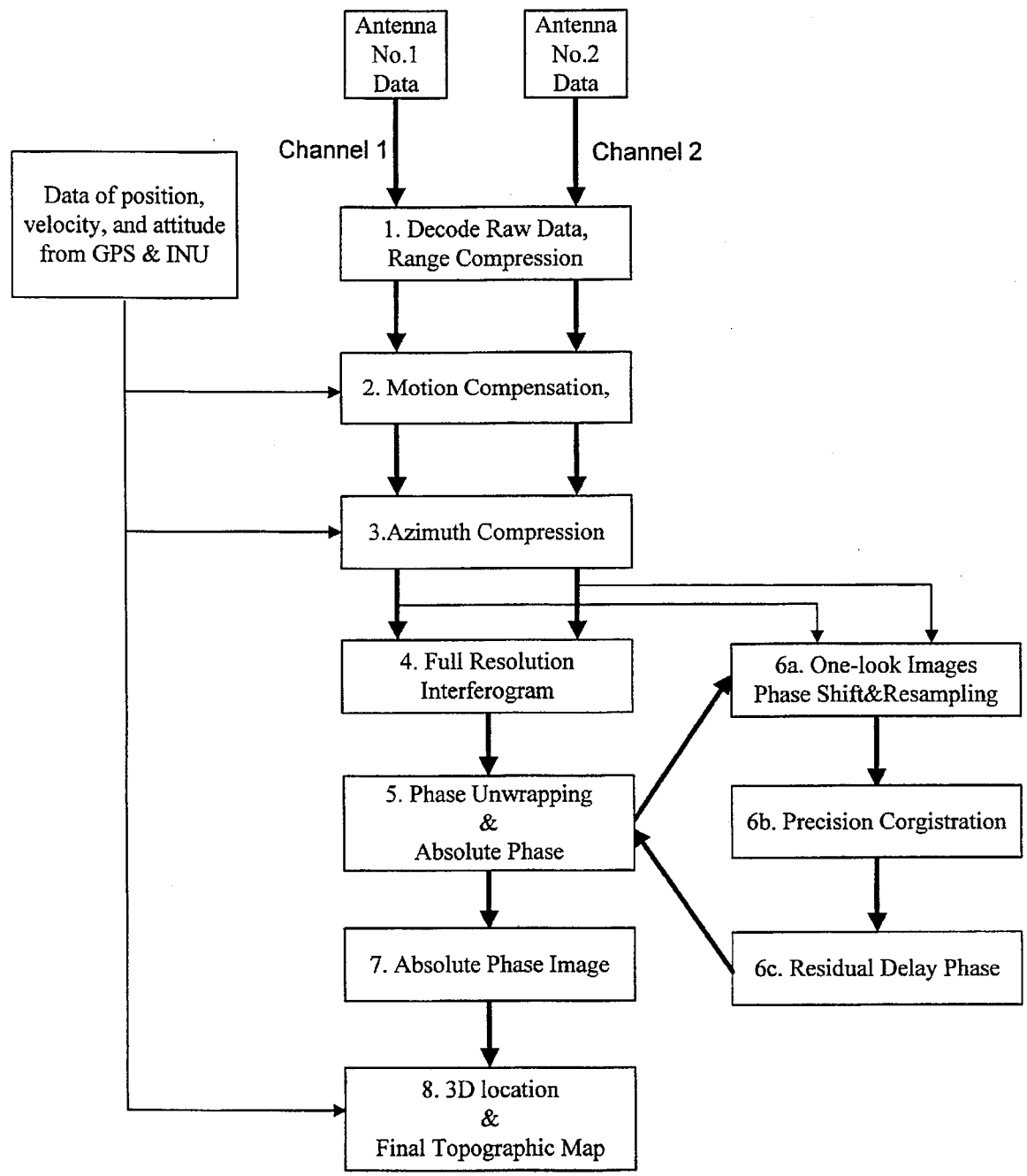
FIG. 4 shows the flow chart of the second embodiment of the interferometric SAR processor of the present invention based on residual delay technique for absolute phase determination.

FIG. 4 is the second embodiment of the interferometric SAR processor in the present invention, which implements an absolute phase determining process, "residual delay technique", without using known ground references.

The residual delay estimation employs the complex images of a given patch from the two data channels to transform one complex image from one channel to be identical to another image using the unwrapped phase. The resulting phase shift is proportional to twice the time delay of the uncompensated range difference between the two images.

The first step is to take the two images from both channels after the azimuth compression and resample them using the unwrapped phase. The resampling is done by range shifting and phase correcting either one channel relative to the other which can also be implemented by range shifting and phase correcting both channels by half the amount in opposite directions. The two channels will be identical to each other after a precise range registration. This procedure removes a part of phase caused by the topographic effects. However, a residual phase is yet to be determined. This residual phase is caused by using a reference plane with unknown height first introduced in motion compensation processing and by the difference in the look vectors for two slightly separated receiving antennas. Moreover, this residual phase remains as a constant over the image patch processed and is equal to difference between the absolute phase value and the unwrapped phase value. In order to precisely measure this phase shift, the measuring accuracy in range difference must be better than one quarter of a wavelength. The correction of this phase shift is added to the unwrapped phase to obtain the absolute phase for the patch.

If the residual delay is large compared to the slant range resolution, the calculated interferogram will have significant decorrelation due to misregistration. It is then necessary to feed the residual phase estimate back to the motion compensation step and redo the processing from that point.

Figure 5:
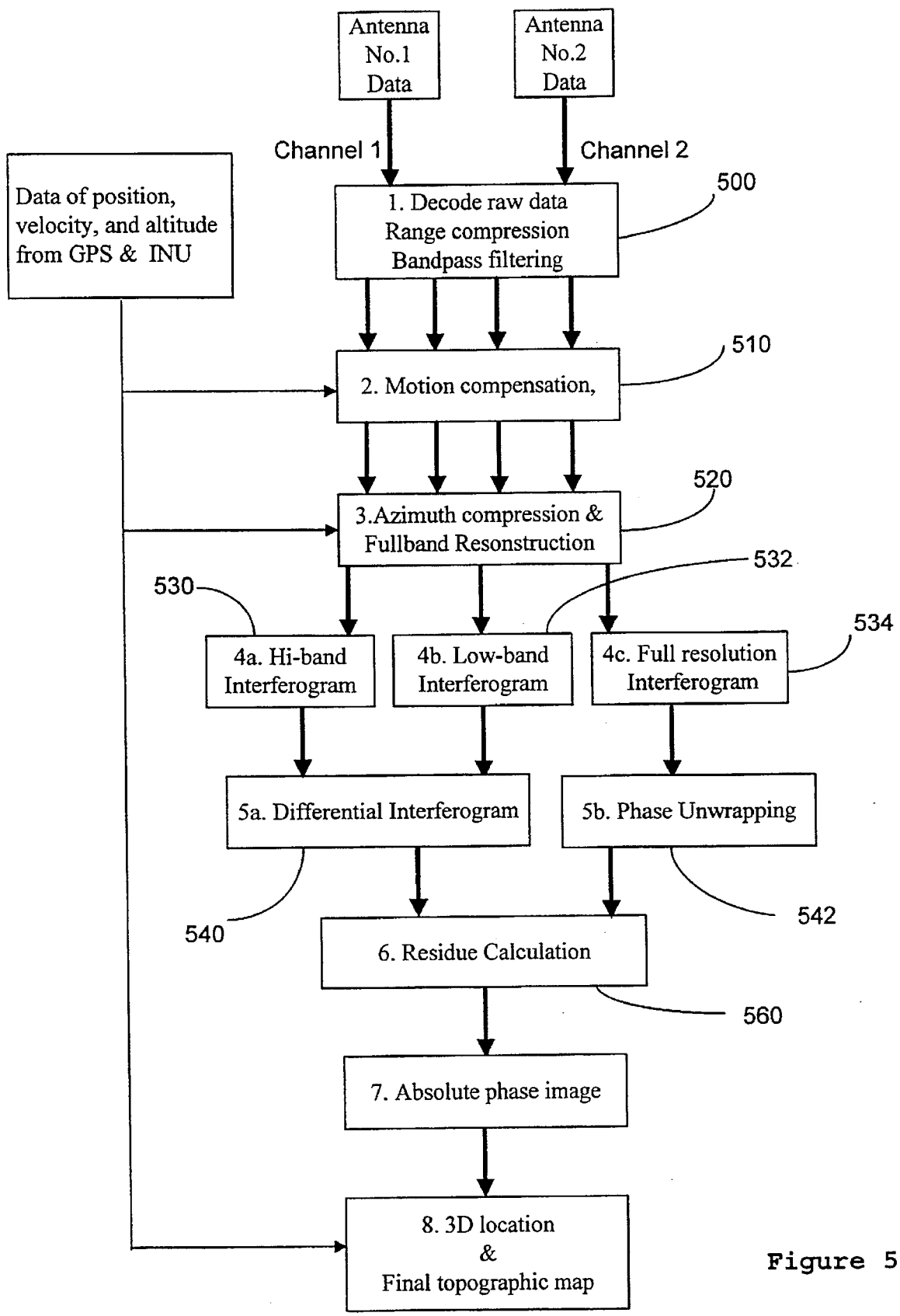
FIG. 5 shows the flow chart of the second embodiment of the interferometric SAR processor of the present invention based on split-spectrum technique for absolute phase determination.

A third embodiment of the interferometric SAR processor of the present invention is shown in FIG. 5. A key in this embodiment is a "split spectrum" technique to determine the absolute phase on a patch to patch basis without using known ground references. The underlying mechanism is that the absolute phase value in the interferogram is proportional to the carrier frequency, and the actual baseband frequency is irrelevant.

The data from each channel of the two received channels is bandpass filtered and divided into two or more channels corresponding to different carrier frequencies. For purpose of illustration, a 2-channel filtering is discussed herein, in which $f_L$ is the center frequency in the low band and $f_H$ is the center frequency in the high band.

After range compression and bandpass filtering 500, the output has four channels: low and high frequency bands from antenna No. 1, and low and high frequency bands from antenna No. 2. These four channels subsequently go through motion compensation process 510 and azimuth compression 520. Motion compensation is to be carried out for different carrier frequencies and different phase corrections thereof are applied. A low frequency band interferogram 532 is formed by multiplying the low subband of antenna No. 2 with the complex conjugate of the low subband of antenna No. 1; a high frequency band interferogram 530 is similarly formed.

Next, the complex interferograms are multilooked for optimal phase determination. A differential interferogram 540 of two channels with different carrier frequencies is formed by multiplying the multilooked high subband interferogram 530 with the complex conjugate of the low subband interferogram 532. Two full resolution complex images are formed by adding the low and high frequency subbands for antenna No. 1 and antenna No. 2, respectively. A full resolution interferogram 534 is formed and multilooked.

The phase $\phi_{Diff}$ of the differential interferogram 540 is the phase difference of the high and low subband interferograms 530 and 532:

$$\phi_{Diff} = \phi_H - \phi_L = -p \frac{2\pi(f_H - f_L)}{c} (r_{2T} - r_{1T}).$$

This phase difference phase value $\phi_{Diff}$ is less than $2\pi$ and can be determined without ambiguity. The absolute phase $\phi$ is expressed in terms of $\phi_{Diff}$ as:

$$\phi = \frac{f}{f_H - f_L} \phi_{Diff},$$

which can be used to determine $\phi$. Since the multiplier will amplify the phase noise in $\phi_{Diff}$, direct application of the above method on a pixel to pixel basis is likely to be difficult. Instead the unwrapped phase value $\phi^{Unwrapped}$ from process 534 is used since it is different from $\phi$ only by an integer multiple of $2\pi$. By averaging the difference between $\phi$ in the above equation and $\phi^{Unwrapped}$ over the entire patch, the noise can be reduced and the integer multiple of $2\pi$ to be added to the unwrapped phase $\phi^{Unwrapped}$ can be determined.

The inventors of the present invention find it advantageous, but not necessarily mandatory, to observe the following in the implementation of the preferred embodiments disclosed thereof: (1) Adjustment of the interferometric baseline 154 of FIG. 1 in a direction perpendicular to the look direction can help to minimize the measurement errors in the interferometric SAR system; and (2) Adjustment of the look direction, the direction of the interferometric baseline, and the local vertical axis in the same place can reduce positioning errors.

In summary, the present invention describes an integrated processing system for SAR interferometry. The correction of radar platform motion deviations, interferogram coregistration of images from two antennas, and a spectral shifting for optimal interferogram correlation, and other processes are incorporated together to achieve highly accurate rate and automated 3D topographic mapping. The present invention implements sophisticated processes to ensure the effectiveness, efficiency, accuracy, and robustness in determining the relative phase values in all image segments as well as the absolute phase of a particular image segment for the absolute phase values of the entire image. One unique feature of the algorithms for absolute phase determination is that the present invention can operate without known ground reference points to determine the absolute phase. These and other advantages of the present invention are further enhanced by use of the novel SCH coordinate system for radar mapping.

Although the present invention has been described in detail with reference to a number of particular embodiments, one ordinarily skilled in the art to which this invention pertains will appreciate that various modifications and enhancements may be made without departing from the spirit and scope of the following claims, in which:

What is claimed:

1. An interferometric method for generating a three dimensional image of a target, comprising:

transmitting coherent electromagnetic probing pulses to said target by using at least one coherent electromagnetic pulse generator, allowing spatial overlap of two illuminated areas upon said target by two sequentially transmitted pulses;

providing a moving carriage and two signal receivers attached to said moving carriage, said receivers being spatially displaced relative to each other and operating to detect electromagnetic signals;

detecting scattered electromagnetic pulses from said target illuminated by said probing waves by using said receivers on said moving carriage;

transforming analog signals of said detected scattered pulses from said receivers to digital signals, forming a first data channel and a second data channel corresponding to said two receivers, respectively;

employing at least one positioning device to obtain attitude, position and velocity information of said moving carriage and thereby attitude, position and velocity information of said receivers;

sequentially dividing received data into a series of patches at a predetermined resolution with any two adjacent patches having partial overlap with each other;

performing a first correlation process on each of said two data channels in a range direction from said carriage to said target based on a first information indicative of a property of said pulses generated by said generator;

aligning said two data channels relative to each other and in particular to a pre-determined spacing in a reference coordinate system within which said data channels are processed;

including Doppler effect in squinted observations in said aligning process using said position and velocity information from said positioning device;

performing a motion compensation process to project both channels onto a local reference motion track in said reference coordinate system, resulting a range shift and thereby a phase shift for both said channels;

carrying out a resampling procedure to interpolate said data at said shifted range value and apply said phase shift to each data point in said first and said second channels;

applying a range migration procedure to both said first and said second channels to adjust a dependence of range on positioning of said carriage with respect to said target by applying a second correlation process to each said data channels in an azimuth direction parallel to said motion track based on a second information indicative of properties of said pulses from said receivers and said attitude information of said receivers;

performing a multiplication of said first data channel with a complex conjugate of said second data channel and thereby producing an interferogram of said two channels;

performing a phase unwrapping process to determine relative phase values of every data point in a patch;

carrying out one of an absolute phase determination process to an unwrapped patch to directly relate said phase of said patch to a range difference from said receivers to said target or a phase-bootstrapping procedure in which phase information of an overlapped region of two adjacent data patches are used for correlating phase values of said two adjacent patches; and producing a three-dimensional image of said target by further processing said interferogram using said position and velocity information from said positioning devices.

2. A method as in claim 1, wherein said range migration procedure includes:

performing a transformation on said first data channel and said second data channel to generated a first transformed channel and a second transformed channel in frequency domain, respectively;

aligning said first transformed channel and a second transformed channel relative to each other in said frequency domain;

obtaining a plurality of range reference functions from said first information with each of said range reference functions corresponding to a range value, said property of said pulses including pulsing frequency and thereby spatial spacing of illuminated areas on said target by said pulses for a predetermined velocity of said carriage;

performing multiplication of complex conjugate of said transformed range reference functions and each of said first transformed channel and said second transformed channel to obtain first product functions and second product functions, respectively; and performing a reverse transformation corresponding to said transformation on each of said first and second product functions to obtain cross correlation between said range reference functions and each of said first and second channels, respectively.

3. A method as in claim 2, wherein said transformation is a fast Fourier transformation.

4. A method as in claim 1, wherein said second correlation process includes:

obtaining a plurality of azimuth reference functions from said second information with each corresponding to a range value, said property of said pulses being indicative of pulsing frequency and thereby spatial spacing of illuminated areas on said target by said pulses for a predetermined velocity of said carriage, and relative positioning of said receivers with respect to said target;

performing a Fourier transformation on said first data channel, said second data channel, and said azimuth reference functions to generate a first transformed channel, a second transformed channel, and transformed azimuth reference functions, respectively;

aligning said first transformed channel and said second transformed channel relative to each other;

performing multiplication of complex conjugate of said transformed azimuth reference functions and each of said first and second transformed channels to obtain first product functions and second product functions, respectively; and performing a reverse Fourier transformation on each of said first product functions and said second product functions to obtain a range-Doppler image for each of said channels.

5. A method as in claim 1, further comprising:

forming an interferogram power array by using power values of each pixel in said interferogram subsequent to said producing of said interferogram; and performing an averaging process to smooth said power array and said interferogram for a predetermined mapping resolution.

6. A method as in claim 5, further comprising a correlation filtering process including:

generating a correlation filter of said interferogram by using amplitude information of each pixel in said interferogram and a mean of power values of said two data channels, said correlation filter operating to indicate a degree of correlation in said interferogram;

applying said correlation filter to determine correlation values of each pixel in said interferogram; and identifying regions in said interferogram that have a correlation value less than a predetermined threshold value and removing said regions from said phase unwrapping and thus said phase-bootstrapping in determining said relative phase values of each data point.

7. A method as in claim 6, wherein:

said predetermined threshold value is selected from a plurality of selected values; and said applying of said correlation filter and said removing said regions in said interferogram that have a correlation value less than said predetermined threshold value are repeated for each of said selected values.

8. A method as in claim 1, wherein said absolute phase determination process is a residual delay process comprising:

obtaining a first image from said first data channel and a second image from said second data channel subsequent to said second correlation process in said azimuth direction;

applying a range-shifting process and a phase-correcting process to said first image and said second image and thereby resampling said first image and said second image;

aligning and registering said first image and said second image with respect to each other, said aligning producing a residual phase value; and determining said residual phase value.

9. A method as in claim 1, further comprising:

filtering said first data channel and said second data channel prior to said performing of said motion compensation process to divide each data channel in to a low frequency channel indicated by a predetermined low carrier frequency and a high frequency channel indicated by a predetermined high carrier frequency, thus resulting in four filtered channels: a first low frequency band channel and a first high frequency band channel from said first data channel and a second low frequency band channel and a second high frequency band channel from said second data channel;

subsequently performing said motion compensation process, said resampling procedure, said range migration procedure, said second correlation process to said four filtered channels;

forming a low frequency band interferogram by using said first low frequency band channel and said second low frequency band channel;

forming a high frequency band interferogram by using said first high frequency band channel and said second high frequency band channel;

forming a full resolution interferogram with said four filtered channels;

producing a differential interferogram by using said low frequency band interferogram and said high frequency band interferogram, said differential interferogram having a differential phase value that is proportional to the absolute phase value of said full resolution interferogram;

applying said phase unwrapping process to said full resolution interferogram to obtain an unwrapped phase value thereof; and performing an averaging operation on the difference between said differential phase value and said unwrapped phase value and thereby determining said absolute phase value.

10. An interferometric synthetic aperture radar system for three-dimensional imaging of a target area, comprising:

a carriage moving along a motion track in said target area;

an electromagnetic pulse generator disposed on said carriage, sequentially producing and transmitting coherent electromagnetic pulsed signals to said target area, said generator and carriage operating to allow spatial overlap of two illuminated areas of two sequentially transmitted pulses;

two electromagnetic signal receivers attached to said carriage and spatially displaced from each other, detecting scattered pulsed signals of said coherent transmitted pulsed signals from said target area;

an analog-to-digital converter capable of transforming analog signals into digital form;

a data storing device for retaining digital signals;

a positioning device, providing attitude, velocity and position information of said carriage and thereby said signal receivers;

an electronic processor, operating to process said signals in digital form for a three dimensional electronic image of said target area based on a coherence property of said signals;

a first signal processing mechanism in said processor, enabling said processor to encode said attitude, position and velocity information of said receivers to said signals, forming a first data channel and a second data channel corresponding to said two receivers, respectively;

a second signal processing mechanism in said processor, enabling said processor to obtain spatial frequency information of said signals in both an azimuth direction along said motion track and in a range direction from said carriage to said target area, to sequentially divide received data into a series of patches at a predetermined resolution with any two adjacent patches having partial overlap with each other, and to perform a first correlation process on each of said two data channels in a range direction from said carriage to said target based on a first information indicative of a property of said pulses detected by said receivers;

a third signal processing mechanism in said processor, enabling said processor to align said first data channel and said second data channel with respect to a common reference, to perform a motion compensation process to project both channels onto said reference, resulting a range shift and a phase shift for both said channels;

said third signal processing mechanism operating to enable said processor to carry out a resampling procedure to interpolate said data at said shifted range value and apply said phase shift to signal values in said first and said second channels and to apply a range migration procedure to both said first and said second channels to adjust a dependence of range on positioning of said carriage with respect to said target;

a fourth signal processing mechanism in said processor, enabling said processor to apply a second correlation process to each said data channels in said azimuth direction relative to said reference based on a second information indicative of a property of said pulses, said velocity information of said carriage, and relative positioning of said receivers with respect to said target;

said fourth signal processing mechanism further enabling said processor to produce an interferogram by correlating said first data channel with said second data channel;

a phase unwrapping mechanism in said processor, enabling said processor to perform a phase-bootstrapping procedure in which phase information of a overlapped region of two adjacent data patches are used for correlating phase values of said two adjacent patches, and to determine relative phase values of every data point in a patch that is bootstrapped by said phase-bootstrapping process;

a phase resolving mechanism in said processor, enabling said processor to cross correlate a first subset of data of said interferogram with a second sub set of data thereof and thereby to determine a absolute phase value of said interferogram directly relating to a difference between a first range from said target area to said first receiver and a second range from said target area to said second receiver; and an imaging mechanism in said processor, producing said three dimensional image by having said processor to correlate each pixel in said interferogram with said position information from said positioning device.

11. A system as in claim 10, wherein said first correlation process includes:

performing a transformation on said first data channel and said second data channel to generated a first transformed channel and a second transformed channel in frequency domain, respectively;

aligning said first transformed channel and a second transformed channel relative to each other in said frequency domain;

obtaining a plurality of range reference functions from said first information with each of said range reference functions corresponding to a range value, said property of said pulses including pulsing frequency and thereby spatial spacing of illuminated areas on said target by said pulses for a predetermined velocity of said carriage;

performing multiplication of complex conjugate of said transformed range reference functions and each of said first transformed channel and said second transformed channel to obtain first product functions and second product functions, respectively; and performing a reverse transformation corresponding to said transformation on each of said first and second product functions to obtain cross correlation between said range reference functions and each of said first and second channels, respectively.

12. A system as in claim 10, wherein said second correlation process includes:

obtaining a plurality of azimuth reference functions from said second information with each corresponding to a range value, said property of said pulses being indicative of pulsing frequency and thereby spatial spacing of illuminated areas on said target by said pulses for a predetermined velocity of said carriage, and relative positioning of said receivers with respect to said target;

performing a Fourier transformation on said first data channel, said second data channel, and said azimuth reference functions to generate a first transformed channel, a second transformed channel, and transformed azimuth reference functions, respectively;

aligning said first transformed channel and said second transformed channel relative to each other;

performing multiplication of complex conjugate of said transformed azimuth reference functions and each of said first and second transformed channels to obtain first product functions and second product functions, respectively; and performing a reverse Fourier transformation on each of said first product functions and said second product functions to obtain a range-Doppler image for each of said channels.

13. A system as in claim 10, wherein said fourth signal processing can further enable said processor to:

form an interferogram power array by using power values of each pixel in said interferogram subsequent to said producing of said interferogram; and perform an averaging process to smooth said power array and said interferogram for a predetermined mapping resolution.

14. A system as in claim 13, further comprising a correlation filtering mechanism in said processor, operating to make said processor capable of:

generating a correlation filter of said interferogram by using amplitude information of each pixel in said interferogram and a mean of power values of said two data channels, said correlation filter operating to indicate a degree of correlation in said interferogram;

applying said correlation filter to determine correlation values of each pixel in said interferogram; and identifying regions in said interferogram that have a correlation value that is less than a predetermined threshold value and removing said regions from said phase unwrapping and thus said phase-bootstrapping in determining said relative phase values of each data point.

* * * * *